United States Patent [19]
Dahlin et al.

[11] Patent Number: 5,293,423
[45] Date of Patent: Mar. 8, 1994

[54] SYNCHRONIZING METHOD IN A MOBILE RADIO SYSTEM

[75] Inventors: Jan E. Å. S. Dahlin, Järfälla; Walter Ghisler, Upplands Väsby; Bengt Y. Persson, Djursholm, all of Sweden

[73] Assignee: Telefonaktiebolaget L M Ericsson, Stockholm, Sweden

[21] Appl. No.: 987,244

[22] Filed: Dec. 7, 1992

Related U.S. Application Data

[63] Continuation of Ser. No. 578,572, Sep. 7, 1990, abandoned.

[30] Foreign Application Priority Data

Sep. 12, 1989 [SE] Sweden .............................. 8902994-6

[51] Int. Cl.⁵ .............................................. H04L 9/12
[52] U.S. Cl. ......................................... 380/48; 380/49; 370/100.1; 375/106; 379/58; 379/59; 379/60; 455/33.1; 455/33.2; 455/56.1
[58] Field of Search ............... 380/46, 48, 49; 379/58, 379/62, 63, 60, 59; 455/56.1, 33.1, 33.2; 370/100.1, 103, 105.1, 107; 375/106, 107, 110, 112, 114, 115

[56] References Cited

U.S. PATENT DOCUMENTS 4,827,507  5/1989  Marry et al. .................... 380/48 X
5,081,679  1/1992  Dent ................................. 380/48

FOREIGN PATENT DOCUMENTS 1429469  3/1976  United Kingdom .......... H04L 9/00
1508971  4/1978  United Kingdom .......... H04L 9/04

OTHER PUBLICATIONS

European Search Report for Application No. 9017473.1 of Dec. 4, 1990.

Primary Examiner—Bernarr E. Gregory
Attorney, Agent, or Firm—Burns, Doane, Swecker & Mathis

[57] ABSTRACT

A synchronizing method in a mobile radio system which operates with Time Division Multiple Access (TDMA) but which lacks global time reference for all base stations and mobiles in the system. The inventive method is intended for ciphered transmission of data and speech in accordance with a given ciphering key (E2). When handing-over a call, the ciphering synchronism is lost. In accordance with the method, subsequent to hand-off (the time $t_2$), the take-over base station (BS2) signals non-ciphered information (S1) to the mobile (MS) disclosing the number of frames (R1-R13) which shall pass until ciphering can again be commenced, calculated from a given frame (R1). Call information is transmit the following frame (R2), this information now being ciphered with the aid of a ciphering key (E1) different to the original key. This other ciphering key consists of a periodic bit sequence having a period which is equal to one frame interval.

10 Claims, 2 Drawing Sheets

SYNCHRONIZING METHOD IN A MOBILE RADIO SYSTEM

This application is a continuation of application Ser. No. 07/578,572, filed Sep. 7, 1990, now abandoned.

BACKGROUND OF THE INVENTION

1. Field of the Invention

The present invention relates to a synchronizing method in a mobile radio system which lacks a global time reference, i.e. a system which lacks a time reference that is common to all mobiles and base stations in the system. More specifically, although not exclusively, the present invention relates to a method of synchronizing a random bit flow which is superimposed cryptically on the normal traffic flow during call transmission or data transmission between the base stations and the mobiles. The present invention can be applied solely to a so-called TDMA-system, i.e. a mobile radio system in which calls are transferred in frames and time slots by means of time multiplexing.

2. Description of Prior Art

It is desirable in mobile radio systems, and in TDMA-systems in particular, to be able to maintain the security of calls so as to prevent unauthorized persons from setting-up and making calls over the network. In order to meet this requirement, it has been suggested that the calls are ciphered; see for instance EP-A-273289.

Calls between a base station and a mobile are ciphered by processing the speech message in a scrambler, which functions to convert the speech signals into a random sequence in accordance with a given key. For instance, the speech signals can be superimposed with a random sequence of bits of relatively long duration (several minutes). In this case, the cipher key consists in the knowledge of the total bit pattern of the sequence and also knowledge of the time at which the sequence was commenced. An authorized subscriber can plug into a circuit module in the apparatus which stores this sequence and said starting timepoint, and is thus able to decode incoming calls.

Some TDMA mobile radio systems lack a global time reference, i.e. means in the mobile telephone exchange which contains a clock common to the overall system and operative to produce the same time reference for all base stations and mobiles in the system. The purpose of such a common time reference is to enable the mobiles and the base stations to be synchronized with one another in certain frames and time slots when synchronizing from signalling or data/speech signals falls away for some reason or other. When transferring (hand-off) a call from one radio channel to another radio channel, synchronization between the mobile and its base station may be los, since a brief interruption will occur during the actual transmission or switching of the call. If the call is also ciphered, a further problem can occur as a result of fall-off of the synchronism of the actual ciphering key concerned, thereby rendering deciphering impossible.

These problems also occur when setting up ciphered calls, although said problems are most pronounced during "hand-off".

SUMMARY OF THE INVENTION

The present invention is based on the time sharing in different frames of the traffic flow (TDMA-principle) and also on the access to a given ciphering sequence of relatively long duration (about 3 minutes) in relation to the time during which coupling or "hand-off" shall take place. The invention is also based on ciphering by superimposing a bit sequence on the normal traffic flow (data or speech signalling). Prior to handing-off a call or during a given time interval during hand-off where synchronization of the ciphering sequence has ceased, non-ciphered signalling is effected and thereafter the traffic flow is ciphered with a periodic bit sequency whose period is equal to a frame time interval. This enables synchronization data to be transmitted to a mobile from a base station simultaneously with a ciphered traffic flow and discloses when normal ciphering shall commence.

The object of the present invention is thus to achieve synchronization of a cryptosequence when setting up or "handing-off" calls in a mobile telephone system which lacks a common time reference.

The invention is characterized by the features set forth in the following claims.

BRIEF DESCRIPTION OF THE DRAWINGS

The invention will now be described in more detail with reference to the accompanying drawings, in which.

DETAILED DESCRIPTION OF THE PREFERRED EMBODIMENT

Figure 1:
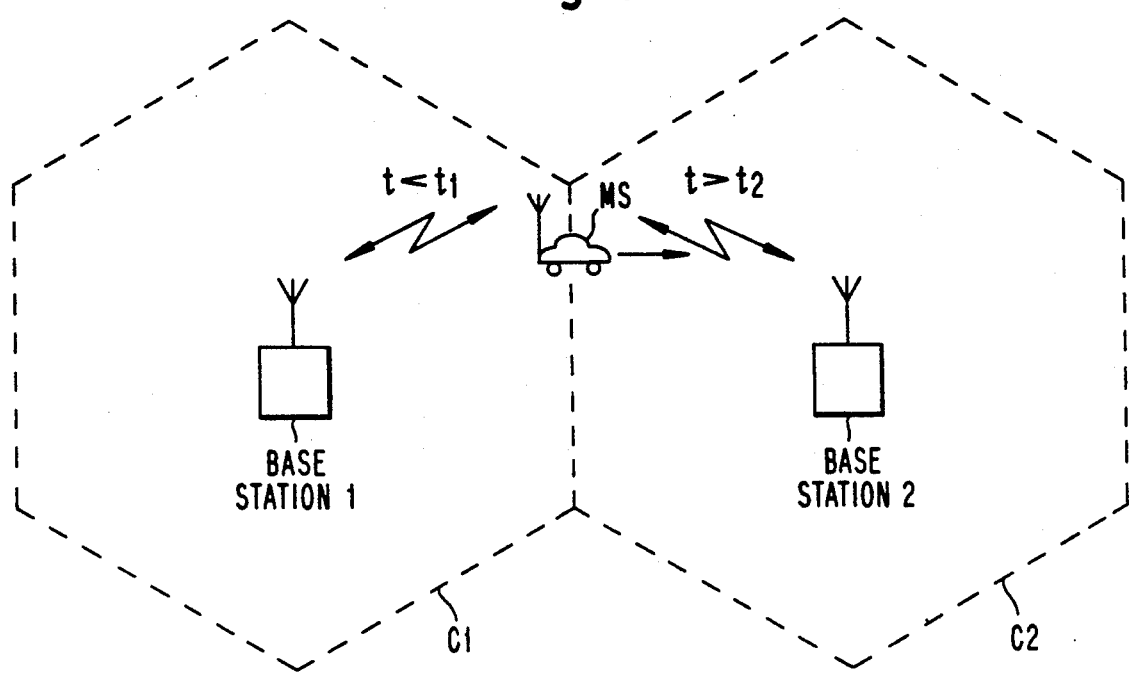
FIG. 1 is a schematic illustration of two base stations and a mobile unit.
Figure 1:
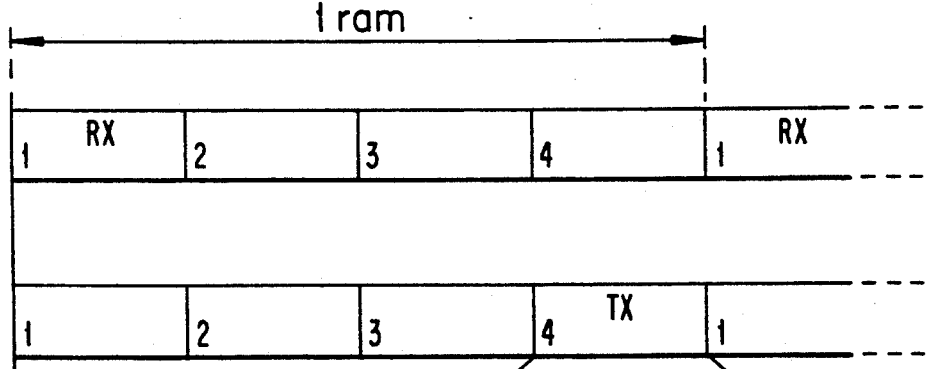

FIG. 1 illustrates schematically two base stations BS1 and BS2 and a mobile MS which is assumed to move from the base station BS1 towards the base station BS2. The base station BS1 serves traffic within the cell C1 and the base station BS2 serves traffic within the cell C2. The cells C1 and C2 have a common border G. When the mobile MS approaches the border G, the speech quality for a coupled call served by the base station BS1 over a given radio channel K1 will fall-off. Switching of a new radio channel K2 to the mobile MS from the base station BS1 is effected, by measuring the field strength of the radio signal and making calculations in accordance with known principles. This new channel K2 is served by the base station BS2. During the actual switching sequence, which may have a duration of about 100 ms, the mobile MS will not receive and the receiving circuits in the mobile MS can lose the synchronism of the traffic flow, i.e., the time position of the frames and time slots from base station BS1.

Figure 2:
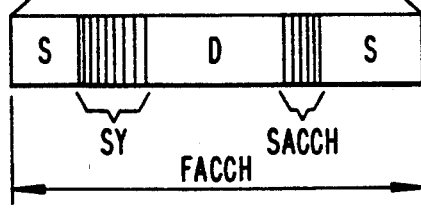
FIG. 2 is a time diagram for transmitting and receiving in accordance with the TDMA-principle.

FIG. 2 illustrates a transmitting frame and a receiving frame (RX and TX respectively) for the mobile MS.

It is assumed that prior to "hand-off", the traffic flow is ciphered with a certain key E2. This key consists of a bit sequence or a section of a longer, random bit sequence E (e.g. about 3 minutes long), which is superimposed on the traffic flow through modulo 2-addition bit for bit. As will be understood, the key E is known to the mobile MS when this is authorized to transmit and receive calls, and the base station BS1 transmit data concerning the starting time point, i.e., the place in the sequence E at which the bit flow shall commence, i.e., the key E2 is known to the mobile MS. This ciphering technique is known in the art.

Figure 3:
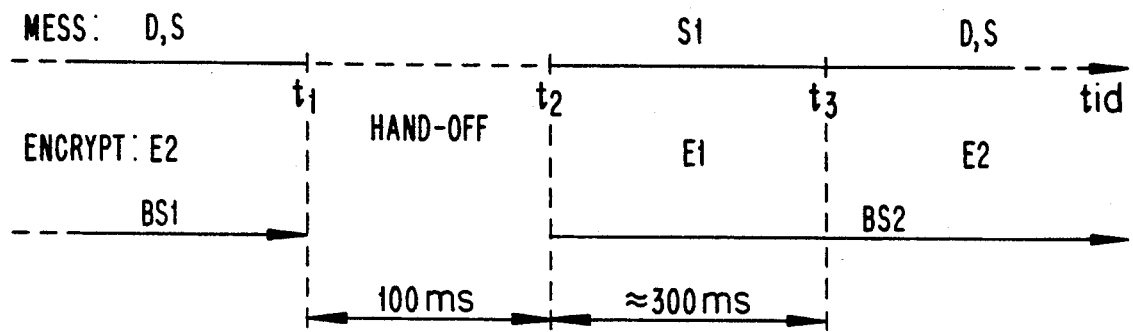
FIG. 3 is a time diagram for ciphering in accordance with the proposed method.

FIG. 3 is a time diagram which illustrates application of the method during "hand-off". It is assumed that the base station BS1 communicates with the mobile MS and that the communication (the speech) is ciphered by means of a crypto key E2 up to the time point $t_1$. Hand-off takes place at the time $t_1$.

Upon termination of the "hand-off" process at time $t_2$, the mobile MS has synchronized with the new base station BS2. There is namely transmitted from this base station on a given control channel (SY in FIG. 2) during the time $t_1 - t_2$ a synchronizing sequence which denotes the time position of the frames and the allotted time slot for the continued call communication between the base station BS2 and the mobile MS. This is effected in a known manner by means of a correlation process in the mobile MS. Thus, at the time $t = t_2$, there is frame synchronization for speech/data transmission between the base station BS2 and the mobile MS, but not for the ciphering. At the time $t = t_2$, the base station BS2 transmits a non-ciphered signal which denotes when ciphering in accordance with the key E2 shall recommence, i.e. the base station BS2 announces the time point $t_3$. The traffic flow (speech/data) is ciphered in subsequent frames with a key E1 which consists of a periodic, random bit sequence having a period equal to the frame interval. This enables the mobile MS to count the number of frame intervals (announced by the non-ciphered signal) until ciphering in accordance with the key E2 is commenced by the base station BS2. Possibly the ciphering key E1 can consist of zeros only, i.e., the traffic flow in subsequent frames is transmitted unciphered (interval $t_2-t_3$). The mobile MS can anyway count the number of frame intervals in spite of absence of the periodic bit sequence in the key E1, due to the presence of frame synchronization in the control channel SY from the time point $t_2$.

Figure 4:
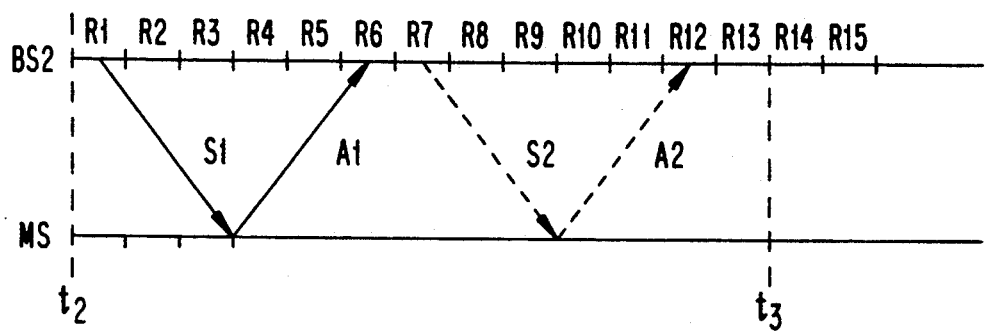
FIG. 4 illustrates, in more detail, signalling during a given time interval in accordance with FIG. 3.

FIG. 4 illustrates the sequence during the time interval $t_2-t_3$ more clearly.

According to FIG. 3, at time $t_2$ the mobile MS is synchronized to the new base station BS2 and the normal traffic flow (data, speech, synchronization) should have commenced if no ciphering has been employed. Synchronization with respect to the bit flow in the ciphering key E2 up to the time $t_1$, however, has been lost. The base station therefore sends to the mobile MS a signal S1 which indicates how many frames shall pass until ciphering according to key E2 is to be commenced. This frame number is assumed to be 13 in the FIG. 4 illustration. This message can be transmitted in a non-ciphered form on the so-called FACCH (Fast Associated Control Channel) formed by a reserved time slot within a frame, see FIG. 2. This time slot is thus located in frame R1. During the frames R2, R3, . . . R6 following the frame R1, the ciphered call information is transmitted and ciphered with the key E1. As before mentioned, this key is a periodic bit sequence whose period equals one frame interval and which can be superimposed on the call information by modulo-2 addition. Consequently, the mobile MS is aware of the time at which counting shall commence and also of the number of frame intervals to be counted. When this is understood by the mobile, a confirmation signal A1 is transmitted back to the base station BS2 and received in frame R6. When the base station BS2 receives this signal, the base station BS2 will wait for a period of time which equals the agreed number of frames, i.e. to frame R13 ($t = t_3$) where ciphering in accordance with the key E2 is commenced.

The base station BS2 thus waits a given length of time (in FIG. 4 a time equalling 5 frame intervals) for receipt of the confirmation signal A1. If for some reason, this signal is not received by the base station BS2 within a given period of time, a signal S2 is again transmitted in frame R7 and a new confirmation signal A2 is awaited. The signal A1 can fall away because, e.g., of fading or difficult surrounding conditions at precisely the interval in which the signal A1 is transmitted. Thus, the number of frames (=R13) from the base station BS2 should be sufficiently large to enable repeated signalling according to the above to be carried out.

The signal delay between base station and mobile has been assumed to be about 2-3 frame intervals ($\approx 15$ ms) in the FIG. 4 illustration. This delay should also be taken into account. Thus, the ciphering time point $t_3$ will preferably be chosen so that $t_2-t_3 > 4$ times the maximum propagation time. This calculation offers no difficulties, since the mobile is located on the border between two cells C1, C2 according to FIG. 1, i.e. at a maximum distance from a base station.

We claim:

1. A method for reestablishing the ciphering of information in a mobile radio system which lacks a global time reference, wherein the data messages and the signalling messages between a first base station and a mobile station are transmitted in frames having time slots and said messages are ciphered by combining said messages with a pseudorandom bit stream, wherein upon handing over the communication of the mobile from the first base station to a second base station ciphering is interrupted for a given period of time during which synchronization of the pseudorandom bit stream with said messages between the mobile and the first base station is lost due to the absence of said global time reference and frame synchronization is established between the mobile and the second base station, comprising the steps of:

generating a first signal which discloses a time point counted in numbers of frame intervals which shall pass until said ciphering is recommenced;

subsequent to completing the hand-over of said messages, transmitting said first signal from the second base station to the mobile station; and recommencing said ciphering upon occurrence of said time point.

2. A method according to claim 1, wherein the messages up to said time point are transmitted by means of a ciphering sequence which comprises a periodic bit sequence whose period is equal to a frame interval.

3. A method according to claim 1, wherein said first signal is transmitted during a frame which immediately precedes the frames which transmit said messages and in the time slot assigned to the mobile station in said frame, and the mobile station when receiving said first signal transmits a confirmation signal to the second base station.

4. A method according to claim 3, wherein if the second base station fails to receive said confirmation signal subsequent to a given time lapse, a further signal is transmitted by the second base station having the same information as the first signal so as to obtain a confirmation signal.

5. A method according to claim 1, wherein said first signal from the second base station to the mobile station is ciphered.

6. A method according to claim 1, wherein said first signal from the second base station tot he mobile station is non-ciphered.

7. A method for reestablishing encryption of information in a mobile radio system having first and second fixed stations and a mobile station comprising the steps of:

encrypting information exchanged between said first fixed station and said mobile station using a first encryption code;

handing-off communications with said mobile station from said first fixed station to said second fixed station, said handing-off including establishing frame synchronization between said second fixed station and said mobile station;

temporarily ceasing use of said first encryption code for communications with said mobile station;

sending notification from said second fixed station to said mobile station informing said mobile station that the use of said first encryption code is to be resumed at a time point after a certain number of frame times have elapsed in communications between said second fixed station and said mobile station; and reestablishing encryption upon occurrence of said time point.

8. The method of claim 7 wherein information exchanged between said second fixed station and said mobile station is encrypted using a second encryption code, consisting of a periodic bit sequence whose period is equal to a frame interval, during the time when use of said first encryption code is temporarily ceased.

9. The method of claim 7 wherein said notification is sent from said second fixed station to said mobile station immediately following hand-off, and wherein said mobile station confirms to said second fixed station receipt of said notification.

10. The method of claim 9 wherein if said second fixed station is not confirmed of said mobile station's receipt of said notification within a predetermined period of time, said notification is re-sent to said mobile station, which confirms receipt of said notification re-sent.

* * * * *